United States Patent [19]
Miles et al.

[11] Patent Number: 6,115,882
[45] Date of Patent: *Sep. 12, 2000

[54] CASTER WITH A SHAPED STEM

[75] Inventors: Joseph Miles, Tampa, Fla.; Earl Joseph Reilly, Jr., Prospect, Conn.

[73] Assignee: United Auto Systems Inc., Tampa, Fla.

[*] Notice: This patent is subject to a terminal disclaimer.

[21] Appl. No.: 09/118,365

[22] Filed: Jul. 17, 1998

Related U.S. Application Data

[63] Continuation-in-part of application No. 08/787,586, Jan. 22, 1997, Pat. No. 5,813,090.

[51] Int. Cl.$^7$ .................................................. B60B 33/00
[52] U.S. Cl. ........................................ 16/37; 16/38; 16/43
[58] Field of Search ............................. 16/18 R, 19, 20, 16/31 A, 30, 31 R, 35 R, 37–39, 43, 18 A; 280/250.1, 87.051, 304.1

[56] References Cited

U.S. PATENT DOCUMENTS

| | | | |
|---|---|---|---|
| 314,962 | 3/1885 | Mendenhall | 16/22 |
| 1,036,726 | 8/1912 | Salisbury | 16/35 R |
| 2,253,824 | 8/1941 | Townsend et al. | 16/20 |
| 4,405,142 | 9/1983 | Whetstine | 16/19 |
| 4,543,685 | 10/1985 | Kassai | 16/35 R |
| 4,649,596 | 3/1987 | Kassai | 16/35 R |
| 4,788,741 | 12/1988 | Hilborn | 16/43 |
| 5,008,976 | 4/1991 | Busch | 16/276 |
| 5,527,051 | 6/1996 | Plaza | 16/35 R |
| 5,727,285 | 3/1998 | Goman | 16/43 |
| 5,745,951 | 5/1998 | Waner | 16/31 R |
| 5,813,090 | 9/1998 | Miles | 16/37 |

*Primary Examiner*—Chuck Y. Mah
*Assistant Examiner*—Donald M. Gurley
*Attorney, Agent, or Firm*—Sam Silverberg

[57] ABSTRACT

A caster with a stem extending upwards from a base and defining a stem axis and wherein the stem has a hole having a circumference defined by an internal threading for fastening to a correspondingly externally threaded fastener; a bearing for interconnecting said base and said stem such that said base is free to rotate about said stem axis; wherein at least a part of the external surface of the upper end of said stem has a shape that inhibits rotation of the stem when inserted into a correspondingly shaped bore hole, wherein said shape is defined by a curved surface or planar surface or a combination thereof; and wherein the curve or planar surface does not intersect the circumference defined by the internal threading.

12 Claims, 4 Drawing Sheets

CASTER WITH A SHAPED STEM

This application is a continuation in part of a U.S. Patent application having Ser. No 08/787,586 filed on Jan. 22, 1997, now U.S. Pat. No. 5,813,090.

BACKGROUND OF THE INVENTION

1. Field of the Invention

The present invention provides a solution to the problem of long-term wear between a caster and the mobile platform it is supporting. More particularly, the invention concerns a caster with a stem shaped for better engagement with the mobile platform it is supporting, thereby to reduce wear.

2. Description of the Related Art

Conventional casters are designed to support a mobile platform such as a shopping cart, an office chair, a scaffold, a truck, or a mechanic's creeper, above the ground. A caster is generally comprised of a wheel, a yoke, and a stem. The yoke is comprised of a generally horizontal base and two forks, the forks being generally parallel to each other and extending downwardly from the base. The ends of the forks support the wheel axle which in turn supports the caster wheel. The caster wheel is mounted so as to rotate freely about an axle, usually a nut and bolt axle or a riveted axle, which defines the horizontal axis of the wheel. Bearings are usually provided to decrease friction between the wheel hub and the axle and thereby improve the life of the wheel. Bearings may be selected from a wide variety of types including as roller, flanged, ball, delrin, and plain bore bearings.

Extending upwardly from the base is the stem, also referred to as a post, a load supporting member, a king pin or a pintle. The base is mounted on the stem in a manner which permits the yoke and wheel to turn about the vertical axis of the stud. The horizontal axis of the wheel is laterally offset from the vertical axis of the stud, and the wheel is thus free to rotate about the horizontal axis located behind the axis of the stud, and to pivot around the axis of the stud, when the mobile platform is in motion. The pivotability of the wheel and yoke with respect to the stem is usually achieved by supporting the yoke base between an upper set of ball bearings and, usually, also a lower set of ball bearings.

The caster is secured to the mobile platform by introducing the stem into a bore hole in the mobile platform so that the wheel of the caster extends down from the bottom of the platform. The stem may be provided with a high friction or self locking feature such that it remains in place once seated. Alternatively, the stem may be externally or internally threaded such that a correspondingly threaded metal fastener can be screwed onto or into the upper end of the stem to thereby securely fasten the caster to the mobile platform. For example, as shown in U.S. Pat. No. 5,527,051, the stem may be externally threaded, and a hollow internally threaded cap with a flanged top is threadably secured to the stem which extends upwardly through the bore hole from the bottom of the mobile platform.

Casters of this type are well known in the art and representative examples can be found in, e.g., U.S. Pat. No. 4,788,741 "Keyed Mounting Assembly for Lockable Swivel Caster"; U.S. Pat. No. 3,942,220 "Caster Sleeve"; U.S. Pat. No. 4,361,930 "Caster Socket Assembly"; U.S. Pat. No. 5,199,131 "Thermoplastic Caster Assembly"; U.S. Pat. No. 5,167,048 "Caster Wheel Retention Device"; U.S. Pat. No. 4,706,328 "Pivoted Caster Wheel and Yoke Brake Having a Detent"; U.S. Pat. No. 5,287,594 "Shopping Cart Swivel Yoke Assembly with Plastic Bearing Races"; U.S. Pat. No. 4,759,097 "Wheel Bracket Assembly Having Two Part-Wheel Bracket and a Method of Making the Wheel Bracket Assembly"; U.S. Pat. No. 5,527,051 "Mechanic's Creeper"; U.S. Pat. No. 5,012,550 "Caster With Brake"; U.S. Pat. No. 3,388,419 "Caster Locking Means"; U.S. Pat. No. 4,998,320 "Apparatus for Movably Supporting Beds and the Like"; U.S. Pat. No. 4,941,552 "Castor with Brake Mechanism"; and U.S. Pat. No. 5,331,717 "Automatic Locking Mechanism for Entraining Castor wheel Vehicles", these disclosures with respect to wheels, yokes, and swivel stems are incorporated herein by reference.

While a stem secured in a conventional manner may appear to be very stable when new, the stem fit does tend to wear out after extended normal use. This is because a small amount of play naturally exists between the stem and the bore hole, and after a heavily loaded mobile platform is pushed or pulled over rough ground over long periods of time, vibration wears the socket and loosens the metal fastener. Further, since the caster is designed to swivel, and since the bore hole and stem are generally cylindrical, this swiveling tends to transmit some torque to the kingpin, causing it to unscrew from the metal fastener over time. Once the stem starts to fit loosely in the borehole of the mobile platform, the fit begins to deteriorate rapidly, and repair of the condition is difficult.

One approach to addressing this problem involved drilling a hole laterally through the stem (and mobile platform) and inserting a pin such as a cotter pin through the hole to prevent rotation between the stem and mobile platform. However, such a pin is easy to break, difficult to remove when worn, and presents additional cost in drilling and assembly, besides being less attractive.

It is also known to lock a caster shaft against rotation by use of a lock-and-key form-fitting means as disclosed generally in patents relating to locking wheels, such as U.S. Pat. No. 4,788,741 to Hillborn. Hillborn teaches a caster including a mechanism for locking the caster in place such that the caster cannot pivot relative the vertical axis. This is accomplished by use of, on the one hand, a brake fork arm 22 which, when pressed, prevents the wheel from rotating or swiveling relative to the stem 18. The stem, on the other hand, is generally cylindrical, but has a longitudinal groove. The socket which receives the stem is provided with an inwardly projecting rib. The rib of the socket projects into the longitudinal groove of the stem to prevent rotation of the stem. When the brake fork is actuated, the caster wheel is prevented from rotation about the vertical axis and when the brake fork is deactivated the caster wheel is free to pivot relative to the vertical axis.

However, this caster is designed to be seated in a well in a secondary socket which, in turn, is securely received in the bottom of a hollow leg. The requirement for such a secondary socket represents additional expense in parts and assembly time, and also introduces additional play in the fit between the caster stem and mobile platform as is evident from FIG. 4. Further, such a stem is retained by seating a resilient split ring in a groove in the secondary socket. This makes the caster easy to remove, and unsuitable for heavy duty use such as for a shopping cart or mechanic's creeper. Further, the Hillborn caster stem assembly is not suitable for uses in which the caster must be fastened to a mobile platform with little or no projection above the mobile platform. For example, in a truck, shopping cart, or creeper, a mobile platform must be made as thin as possible. The caster must be securely attached to this thin mobile platform, yet may not project above the mobile platform at any point since any projection above the upper surface of the mobile platform will damage packages placed on the truck or shopping cart, or will hurt or inconvenience a mechanic laying on the creeper.

U.S. Pat. No. 3,388,419 entitled "Caster Locking Means also teaches a locking caster, wherein the stem of the swivel mechanism has a cubic outward appearance. However, no specific means are disclosed for securing the stem to the mobile platform. Further, the square stem shown in this patent can not fit into a conventional bore hole, since a square peg can not be made to fit into a round hole.

In summary, there appears to be no recognition in the art of the problem of wear and loosening of the fit between caster stems, mobile platform, and metal fasteners overtime. In particular, there is no teaching of a caster which can be mounted on a narrow frame with upper mounting hardware fitting flush against the upper surface of the mobile platform or frame, which caster design renders it is simple to install, economical to produce, and capable of installing into either conventional frames or frames having bore holes specifically adapted to receiving them.

There is thus a need for a caster which can be simply and economically produced, which is simple to seat and secure to a narrow mobile platform, and which remains securely seated over long periods of time even after prolonged exposure to vibration and stress. Such a caster should preferably be capable of being seated not only in a bore hole of special design, but also be capable of being seated in a conventional cylindrical bore hole. Thus, casters according to the present invention should be capable of replacing not only other special casters, but also be capable of replacing conventional casters.

SUMMARY OF THE INVENTION

The present inventor has extensively considered the problem of caster stem loosening over time, and has experimented with various caster designs intending to overcome the problem of loosening by rotation. More specifically, the inventor sought to develop a caster which can be mounted into a narrow frame with the upper mounting hardware flush against the upper surface of the frame, which caster design renders it is simple to install, economical to produce, and capable of being installed into either conventional frames or frames having bore holes specifically adapted to receiving them.

After extensive research and experimentation, the present inventor discovered that the above enumerated problems can be solved by providing a caster with a stem designed to seat in a corresponding bore hole and secure itself against rotation. More particularly, the stem is generally cylindrical over much of it's circumference, but is provided with a shape that inhibits rotation of the stem. The mobile platform to which the caster is affixed has a corresponding shaped bore hole, recess or socket for receiving the shaped stem of the caster.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other casters or caster stems for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

After extensive investigation, the inventor discovered that a superior yet economical vibration and torque resistant fit can be achieved between a caster stem and a mobile platform by simply machining a flat face into at least one side of what would otherwise be a conventional internally threaded cylindrical caster stem, and by providing in the mobile platform a corresponding shaped receptacle.

The remainder of the caster can be any conventional design, including any of the specific designs disclosed in the patents referenced in the Background of the Invention section of this application. A caster will now be discussed with respect to one example as shown in the accompanying drawings; however, it should be readily understood that the invention is in no way limited to the illustrated example.

Figure 1:
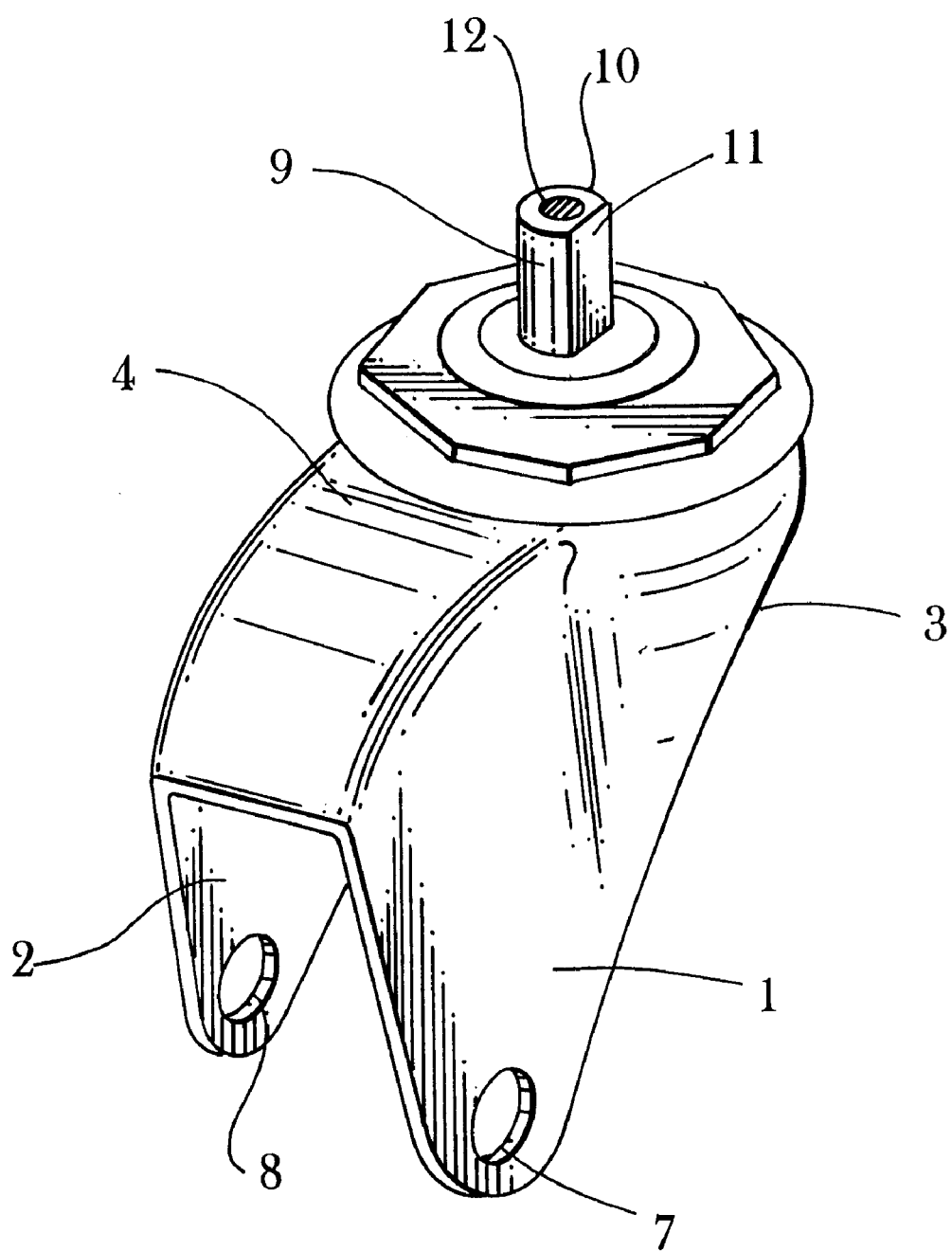
FIG. 1 is an elevated perspective view of an improved caster showing yoke and stem but not the caster wheel.
Figure 2:
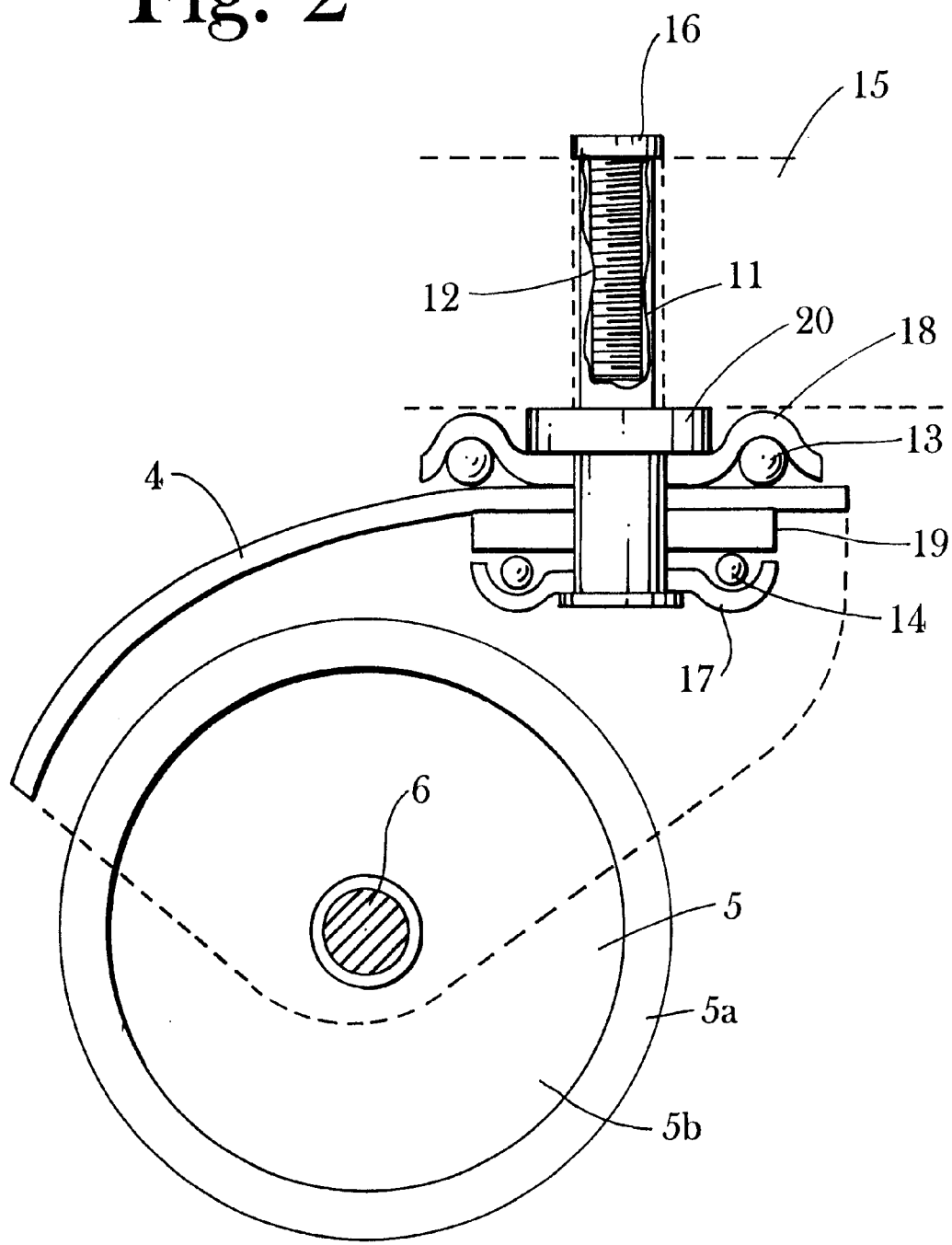
FIG. 2 is a side view of the entire caster of FIG. 1, including wheel.

As seen in FIG. 1, the caster includes a yoke 3 comprising a pair of downwardly depending forks 1, 2 and a base 4. A wheel 5, not shown in FIG. 1 but shown in dashed 20 lines in FIG. 2, is rotatingly mounted on an axle 6 which is received on the forks via axle openings. The wheel part 5 may be formed of a polyolefin, urethane, stanoprene, phenolic resin, or rubber, or a composite such as a soft or hard rubber tread 5a provided on a hard rubber or plastic core 5b. The wheel is mounted so as to rotate freely about an axle 6, which in practice is usually a nut and bolt axle 5 or a riveted axle. Bearings may be provided to decrease friction between the wheel and axle and thereby improve the life of the wheel, and may be selected from a wide variety of types including as roller, flanged, ball, delrin, and plain bore bearings.

Extending upwardly from the generally horizontal base 4 is a stem 9. The base is preferably supported between an upper set of ball bearings 13 and, usually, a lower set of ball bearings 14 so that the base is free to swivel with respect to the stem. The manner of retaining the ball bearings is well known. For example, the stem may include an upper race 18 and a lower race 17 such that the base is supported between the lower set of ball bearings provided between the lower race 17 and base, and an upper set of ball bearings provided between the upper race 18 and the base. The races may be retained on the lower portion of the stem in any conventional manner. For example, the lower race may be retained by a flange extending from the lower portion of the stem, or the lower part of the stem may be an accessory or assembly member such as a bolt, a stake, or other flanged member. The upper race 18 may be secured by a locking plate 20. Such a locking plate 20 is preferred, in that also serves as a spacer or rest, with an upper surface having an elevation which will fit flush against mobile platform 15 when mounted, such that all the pressure of the platform does not rest on upper race 18.

The caster is secured to the mobile platform 15 (shown in dashed lines in FIG. 2) by introducing the stem into a bore hole extending through the mobile platform. The stem 9 has a hole having a circumference 12 defined by an internally threading such that a correspondingly threaded metal fastener 16 can be screwed onto or into the upper end of the stem 9 to thereby securely fasten the caster to the mobile platform. The upper metal fastener may have an external hexagonal face or may have an internal allen wrench type socket.

The distinguishing feature of the caster according to the present invention is a stem having an internal threading and an external surface that has been shaped to inhibit rotating of the stem when the stem is fastened. Additionally, the mobile platform into which the stem is inserted is provided with a shaped bore hole dimensioned for receiving the stem with close tolerance.

The size and location of the external surface that inhibits rotation of the stem may vary. The inhibiting shape can occupy a portion or the entire external surface of the stem, The shape of the external surface of the stem that inhibits rotation of the stem can be planar (i.e. flat surface) or curved or combinations thereof. The principle constraint is that the internal threading of the stem remain structurally intact.

An example of a planer surface is when at least the upper end of the stem has a generally cylindrical shape and the stem has a planer surface defined by at least one chord intersecting the circumference of the generally cylindrical shape but not crossing a circumference defined by the internal threading. The planer surface can be further defined by at least a portion of a chord that would intersect the circumference of the generally cylindrical shape.

Examples of a curved surface is oval or elliptical. The oval or elliptical surface can be combined with a planer surface. In this case the external surface is in part an oval or elliptical shape and in part planar.

Figure 3:
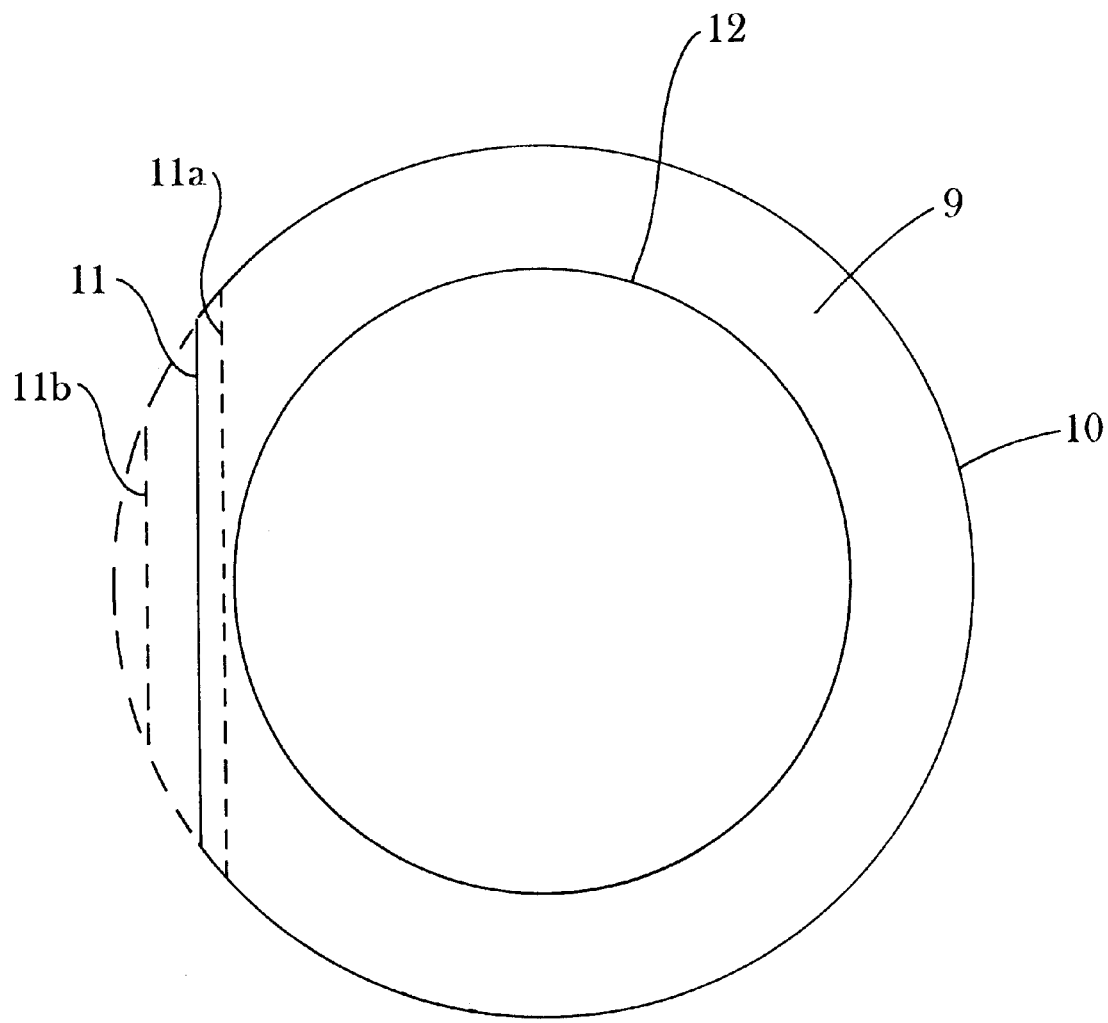
FIG. 3 is a top view of the stem of FIG. 1.

The preferred embodiment is when the stem's external surface has a generally cylindrical shape and a planer surface. As shown in FIG. 3, a planar surface 11 is defined by a chord intersecting the outer circumference 10 of stem 9, but the chord does not cut through internal threading 12. In the case that the chord cuts through internal threading, the stem will open and form a "C" shape rather than a "D" shape, and the structural integrity may be compromised. Thus, the deepest chord is preferably one which approaches, but does not touch, the circumference 12, as shown by phantom line 11a. on the other hand, a shallow chord represented by phantom line 11b which extends through the stem near the hypothetical cylindrical outer surface does not weaken the stem, but also reduces the anti-rotative securing ability of the stem, which the "D" feature is intended to provide. Thus, the deepest part of the chord preferably extends 14 through a point between ⅓ and ⅘ of the distance between outer and inner diameter, most preferably about ½ to ⅔ the distance between outer and inner diameter. The planar surface preferably extend the full length of the exposed stem, i.e., that portion of the stem which is free to extend into the bore hole of the mobile platform.

The "D" shape of the stem fits into a "D" shape bore hole and is thereby secured against rotation. This method of securing reduces slippage which would occur in the case of conventional caster stems. It has a further advantage in that the remainder of the outer diameter of the caster is a standard diameter and is capable of fitting into a standard diameter bore hole. Thus, only one caster design is required to repair either cylindrical or "D" shaped mobile platforms. Further yet, the caster is extremely compact yet strong as compared to other locking stem designs. The "D" shaped stem of the caster wheel is internally threaded so that a bolt or cap that is externally threaded may be used to secure the caster to the mobile platform in a conventional manner. The "D" shaped stem of the caster wheel is then inserted into a "D" shaped socket which has been formed into the truck, furniture, or creeper and a externally threaded bolt or cap is fastened to the internally threaded caster wheel stem to secure the wheel, preventing the loosening and wear damage that occurs through the use of a conventional caster wheel.

Figure 4:
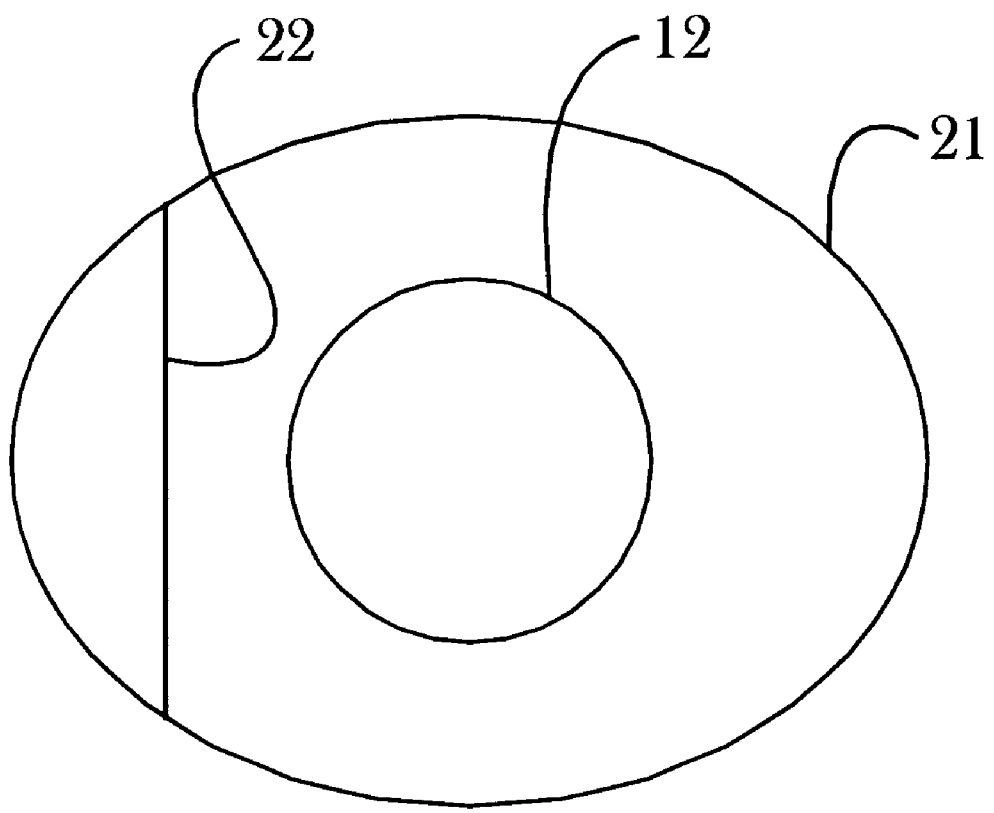
FIG. 4 is a top view of a oval stem with a planer surface.

An other embodiment is when the stem has an oval shape as shown in FIG. 4. The oval shape can be modified by n forming a planer surface for at least a portion of the external surface of the stem. From a top view of the stem, line 22 defines the location of the planer surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and acchordingly, all suitable modifications and equivalents may be resorted to, falling within the scope of the invention.

Now that the invention has been described,

What is claimed is:

1. A caster comprising:

a wheel;

a yoke comprising a generally horizontal base and first and second forks depending from the base;

an axle extending through said first fork and said second fork, and defining an axis of rotation for said wheel such that said wheel is mounted on said axle for rotation between said first and second forks;

a stem extending upwards from said base and defining a stem axis, said base mounted on said stem for rotation about said stem axis wherein said base is free to swivel with respect to the stem;

wherein at least the upper end of said stem has a generally cylindrical surface, wherein the stem has a hole having a circumference defined by an internal threading for fastening to a correspondingly externally threaded fastener;

and wherein said stem includes a generally planar surface defined by at least one chord intersecting the circumference of the generally cylindrical surface but not crossing through said threaded hole's circumference.

2. A caster as in claim 1, wherein said planar surface extends along the entire length of said stem.

3. A caster as in claim 1, wherein said stem includes an upper and a lower race and wherein said base is supported between a lower set of ball bearings provided between said lower race and said base, and an upper set of ball bearings provided between said upper race and said base.

4. A caster as in claim 1, wherein said yoke is steel.

5. A caster as in claim 1, wherein said generally planar surface is defined by a single chord through said circumference of the generally cylindrical surface; the deepest point of which extends between ⅓ and ⅘ of the distance between circumference of the threaded hole and circumference of the generally cylindrical surface.

6. A caster as in claim 5, wherein said generally planar surface is defined by a chord through said circumference of the generally cylindrical surface; the deepest point of which extends between ½ and ⅔ of the distance between the circumference of the threaded hole and the circumference of the generally cylindrical surface.

7. A caster as in claim 1, wherein said stem is steel.

8. A caster comprising:
a yoke comprising a generally horizontal base and first and second forks depending from the base;
a wheel rotatably carried between said first and second forks;
a stem extending upwards from said base and defining a stem axis and wherein the stem has a hole having a circumference defined by an internal threading for fastening to a correspondingly externally threaded fastener;
bearing means for interconnecting said base and said stem such that said base is free to rotate about said stem axis;
wherein the external surface of at least the upper end of said stem has a generally cylindrical surface and at least one generally planar surface;
and wherein said generally planar surface is defined by at least a portion of a chord that would intersect the circumference of the generally cylindrical surface but not crossing through the circumference of the threaded hole.

9. A caster comprising:
a yoke comprising a generally horizontal base and first and second forks depending from the base; a wheel rotatably carried between said first and second forks;
a stem extending upwards from said base and defining a stem axis and wherein the stem has a hole having a circumference defined by an internal threading for fastening to a correspondingly externally threaded fastener;
bearing means for interconnecting said base and said stem such that said base is free to rotate about said stem axis;
wherein at least a part of the external surface of the upper end of said stem has a shape that inhibits rotation of the stem when inserted into a correspondingly shaped bore hole, wherein said shape is defined by a curved surface or planar surface or a combination thereof;
and wherein the curve or planar surface does not intersect the circumference defined by the internal threading.

10. A caster according to claim 9, wherein the shape of the external surface is an oval.

11. A caster according to claim 10, wherein the shape of the external surface is in part oval and in part planar.

12. A caster according to claim 9, wherein the shape of the external surface is at least in part elliptical.

* * * * *